United States Patent Office 2,802,029
Patented Aug. 6, 1957

2,802,029

BROMSALICYLOYL-CHLORANILIDE

Leonhard Schuler, Heidelberg, Germany, assignor to Knoll A.-G., Chemische Fabriken, Ludwigshafen am Rhine, Germany, a corporation of Germany No Drawing. Application September 18, 1952,
Serial No. 310,347

Claims priority, application Germany October 17, 1951

1 Claim. (Cl. 260—559)

This invention relates to aryl amides of aromatic hydroxy carboxylic acids, and more particularly to halogen substituted arylamides of salicylic acid, and to a method of making said halogen substituted and other arylamides of aromatic hydroxy carboxylic acids.

It is known that salicylic acid anilide has fungicidal properties. It is, for instance, used in the treatment of "ringworm" of the scalp and other fungus infections. Its fungicidal activity, however, is rather low; therefore, comparatively large amounts thereof are required for treatment; however, in higher concentrations, irritation to the skin results. On account of said irritant effects on the skin, its use is generally restricted to ringworm of the scalp.

It is one object of this invention to provide new arylamides of aromatic hydroxy carboxylic acids, and more particularly of salicylic acid which have a surprisingly high antifungal activity and which, also, possess a high bactericidal activity. These new compounds are of special therapeutic importance since fungus infections are frequently accompanied by bacterial infections. The new compounds are capable not only to control fungus infections in much lower dosage than heretofore required but, at the same time, they affect any bacterial infection which might complicate the fungus infection.

Another object of this invention consists in providing new methods of preparing these and other arylamides of aromatic hydroxy carboxylic acids. The new methods of making such compounds have many advantages over the methods used heretofore. For instance, when working according to one of these new methods, it is not necessary, first to produce the acid halogenide and then react the same in a second step operation with a suitable amine. According to this invention it is possible to produce said aryl amides in a one step process directly from the hydroxy carboxylic acids, thus, avoiding the step of producing the acid halogenide which is a very reactive compound and is readily decomposed by moisture. The yields in the new one step process, therefore, are much higher and the reaction products usually purer and much more easily to purify than amides obtained according to the known processes.

Other objects of this invention will become apparent from the specification and the examples given therein.

The valuable new arylamides of salicylic acid which are superior to salicylic acid anilide correspond to the following formula

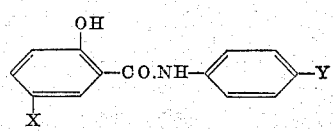

In this formula X and Y are halogen atoms selected from the group consisting of chlorine and bromine, at least one of said X and Y being bromine.

The following compounds have proven to be especially effective fungicidal and bactericidal agents:

5-bromo salicylic acid -4'-chloro anilide
5-bromo salicylic acid-4'-bromo anilide
5-chloro salicylic acid-4'-bromo anilide These and other valuable compounds have at least one halogen atom selected from the group consisting of chlorine and bromine each in the aromatic hydroxy carboxylic acids nucleus and in the arylamide nucleus whereby at least one of said halogen atoms is bromine. The most active compounds of this group are those of the above formula which have one of said halogen atoms in para-position to the hydroxyl group of the aromatic hydroxy carboxylic acid nucleus and another of said halogen atoms in para-position to the amide group of the arylamide nucleus.

These and other halogen substituted arylamides of aromatic hydroxy carboxylic acids and more particularly of salicylic acid are prepared by various methods.

A simple method of making such halogen substituted arylamides of aromatic hydroxy carboxylic acids consists in substituting the nuclear hydrogen atoms of an unsubstituted arylamide of an aromatic hydroxy carboxylic acid by bromine and/or chlorine. It is possible to first introduce one halogen atom into the aromatic hydroxy carboxylic acid nucleus and then another halogen atom into the arylamide nucleus by reacting the unsubstituted arylamide of an aromatic hydroxy carboxylic acid, especially by reacting an unsubstituted salicylic acid arylamide with elementary halogen, i. e. with bromine or chlorine, whereby first halogen is introduced into the salicylic acid nucleus. Heretofore, no attempts have been made to directly halogenate salicylic acid amides by means of elementary halogen because the formation of uniform and definite halogen substitution products could not be expected. It is very surprising that, when using an unsubstituted salicylic acid amide, elementary bromine or chlorine first replace the hydrogen atom in 5-position, i. e. in para-position to the hydroxyl group, and when reacting the resulting 5-bromo or 5-chloro compound with further amounts of bromine or chlorine, the hydrogen atom in 4-position of the arylamide nucleus, i. e. in para-position to the amide group, is substituted by halogen.

Another method of producing such halogen substituted arylamides of aromatic hydroxy carboxylic acids, and more particularly of arylamides of salicylic acid, consists in condensing salicylic acid esters, especially salicylic acid phenyl ester, which are substituted by halogen atoms, with a corresponding, preferably also halogen substituted aromatic amine. In this manner, for instance, 5-chloro salicyclic acid-4'-bromo anilide is obtained by condensing 5-chloro salicylic acid phenyl ester with aniline and subsequently brominating the resulting 5-chloro salicylic acid anilide whereby bromine replaces a hydrogen atom in 4-position of the amide group. When reacting 5-chloro salicylic acid phenyl ester with 4-bromo aniline, the 5-chloro salicylic acid-4'-bromo anilide is directly obtained.

A further method of producing such halogen substituted arylamides of aromatic hydroxy carboxylic acids consists in condensing salicylic acid, preferably substituted in the nucleus by halogen, with aromatic amines, also preferably substituted in the nucleus by halogen, in the presence of phosphorus halogenides and, if desired, by subsequently reacting the salicylic acid arylamide obtained thereby with elementary halogen as described above.

Still another method of producing such compounds consists in reacting amides of halogen substituted aromatic hydroxy carboxylic acids, especially halogen substituted salicylic acid amides, with arylhalogenides which are capable of splitting off hydrogen halide with the amide hydrogen, whereafter the salicylic acid arylamide, if desired, is halogenated, preferably by the action of elementary halogen as described above.

A further method of making said products consists in condensing, for instance, halogenated aromatic hydroxy carboxylic acid halogenides, especially 5-halogeno salicylic acid chloride, with nitro group containing arylamines, such as p-nitro aniline, reducing the nitro group of the resulting arylamide to the amino group, diazotizing said amino group, and decomposing the diazo group by heating with hydrogen halide and cuprous halogenide according to Sandmeyer's method to form the corresponding halogen substituted compound.

A very advantageous new method of producing arylamides of aromatic hydroxy carboxylic acids, which method is principally applicable to any arylamide of such acids consists in melting equimolecular amounts of an aromatic hydroxy carboxylic acid and of an aromatic amine or intimately mixing equimolecular amounts of said acid and amine and reacting thionylchloride with said dry intimate mixture, preferably in the presence of an agent which combines with the hydrogen halide split off during said reacting, especially in the presence of acid binding tertiary bases, such as pyridine, N-dimethyl aniline and others. This new method, in contrast to other processes, yields directly and immediately the arylamide of an aromatic hydroxy carboxylic acid in a high yield and of good quality and purity. This process, therefore, is far superior to the known processes. For instance, when reacting a hydroxy carboxylic acid halogenide with an amine, it is necessary to first produce said acid halogenide. Acid halogenides, however, are difficult to prepare because they are readily decomposed, and their yield, and consequently the yield of the acid amide made therefrom, is rather low. When using according to another known process phosphorus halogenides as condensing agents for condensing equimolecular amounts of hydroxy carboxylic acids and amines, first phosphorus compounds are formed, such as phosphoric acid esters. These phosphorus compounds can be hydrolyzed only with difficulty, thus, causing low yields and impure hydroxy carboxylic acid amides the purification of which is rather tedious and cumbersome. All these difficulties in producing aryl amides of aromatic hydroxy carboxylic acids are overcome by using thionylchloride as condensing agent as described above. The reaction may be facilitated by adding to the reaction mixture an inert diluting and suspending agent, such as benzene, toluene, paraffins and others.

The following examples serve to illustrate this invention without, however, limiting the same thereto.

Example 1

124 g. of salicylic acid-4-chloro anilide are almost completely dissolved in 2.5 liters of carbon disulfide while heating. The solution is then rapidly cooled to form a finely dispersed suspension of the starting material. A solution of 80 cc. of bromine in 250 cc. of carbon disulfide is added, drop by drop, at room temperature to said suspension, while stirring. The reaction mixture is allowed to stand over night. Thereby 195 g. of 5-bromo salicylic acid-4'-chloro-anilide are obtained. They are recrystallized from benzene or ethylene chloride and melt at 241–242° C. Instead of carbon disulfide, ethylene chloride can be used with advantage as a solvent.

Example 2

7 g. of 5-chloro saylicylic acid and 6.8 g. of 4-bromo aniline are molten together and the molten mass is pulverized after cooling. 8 g. of phosphorus trichloride are admixed to the powder and the mixture is slowly heated under reflux to 150–170° C. After the reaction is completed, an excess of phosphorus trichloride is distilled off in a vacuum. 5 g. of 5-chloro salicylic acid-4'-bromo anilide are obtained which, after recrystallisation from benzene, melt at 222° C.

Example 3

42.6 g. of salicylic acid anilide are dissolved in about 170.0 g. of glacial acetic acid or glacial acetic acid containing hydrogen bromide. A solution containing bromine sufficient to introduce one bromine atom into said anilide, is added drop by drop thereto while moderately cooling and stirring. 5-bromo salicylic acid anilide precipitates thereby. It is separated from the reaction mixture and 36 g. thereof are dissolved in 500 cc. of glacial acetic acid and 150 g. of acetic acid ethyl ester. Chlorine gas is introduced into said solution at about 40° C. in an amount surpassing the amount required to introduce one chlorine atom into said anilide. The 5-bromo salicylic acid-4'-chloro anilide obtained thereby is recrystallized from ethanol and melts at 241–242° C.

Example 4

7.5 g. of 3,5-dibromo salicylic acid phenyl ester are heated with 13.2 g. of 4-chloro aniline and 7.5 g. of 1-methyl naphthalene. The phenol split off thereby is continuously distilled off together with 1-methyl naphthalene. The residue is again mixed with 1-methyl naphthalene, decolorizing carbon is added, and the mixture is heated and filtered. On cooling 3,5-dibromo salicylic acid-4'-chloro anilide is obtained which, on recrystallisation from alcohol, melts at 200° C.

Example 5

25 g. of 5-chloro salicylic acid amide, 40 g. of bromo benzene, 10 g. of anhydrous sodium acetate, and 1 g. of copper bronze are heated under reflux for 4 hours. The molten mass is dissolved in alcohol. The solution is filtered and concentrated by evaporation. 5-chloro salicylic-4'-anilide is obtained thereby. It is isolated from the reaction mixture and is dissolved in about 5 times its amount by weight of a mixture of glacial acetic acid and acetic acid ethyl ester (1:1). A bromine solution in acetic acid containing an amount of bromine sufficient to introduce one bromine atom, is added thereto. 5-chloro salicylic acid-4'-bromo anilide precipitates. It melts, after recrystallisation from benzene, at 222° C.

Example 6

191 g. of 5-chloro salicylic acid chloride are dissolved in 2000 cc. of ether. Said solution is mixed with a solution of 138 g. of 4-nitro aniline in 500 cc. of ether. 121 g. of N-dimethylaniline are added to said mixture. The 5-chloro salicylic acid-4'-nitro anilide obtained on said condensation, is treated with water to remove dimethyl aniline hydrochloride, and is reduced, for instance, by hydrogenation in methanolic solution in the presence of Raney nickel catalyst, or by means of iron and ferro sulfate, to 5-chloro salicylic acid-4'-amino anilide. Said anilide is diazotized and decomposed by boiling with cuprous bromide and hydrogen bromide according to Sandmeyer's method to 5-chloro salicylic acid-4'-bromo anilide.

For instance, 29.2 g. (0.1 mol) of 5-chloro salicylic-4'-nitroanilide are dissolved in about 300 cc. of methanol and reduced in presence of about 5 g. Raney nickel with hydrogen at a pressure up to 100 at and a temperature up to about 90° C. till the calculated amount of hydrogen has been absorbed. The resulting amine, 5-chloro salicyl-4'-aminoanilide, is isolated out of the filtrate from the catalyst by suitable methods and diazotized at 0–10° C. in a 40% HBr solution (about 700 cc. for each mol of the amine) with 1.05 mols of sodium nitrite in for each mol of the amine. The resulting diazo compound is forthwith decomposed by the method of Sandmeyer by slowly adding the diazo solution to the usual solution of cuprous bromide in HBr (about 1 l. for each mol of the original amine taken) near the boiling point. The resulting bromo compound, 5-chloro salicyl-4'-bromoanilide, is isolated from the mixture and purified by repeated recrystallisation from boiling alcohol.

Example 7

8 cc. of freshly distilled thionylchloride are added drop by drop, while stirring, to a mixture of 30 cc. of dry benzene, 9.6 g. of salicylic acid, 6.7 g. of aniline, and 15 g. of N-dimethylaniline, said mixture being cooled to 10–20° C. The reaction mixture is then heated for a short period of time in the steam bath. After evaporating in a vacuum the solvent and other volatile substances, the residue is successively treated with water, hydrochloric acid, and sodium bicarbonate to free the same of unreacted starting materials, and the salicylic acid anilide is purified by recrystallisation from alcohol.

Example 8

18 cc. of thionylchloride are added drop by drop to a finely pulverized molten mixture of 14 g. of salicylic acid and 13 g. of p-chloro aniline. The reaction mixture is then heated under reflux on a water bath for a longer period of time. Excess thionylchloride is evaporated in a vacuum and the residue is freed of unreacted compounds by a treatment with dilute hydrochloric acid followed by a treatment with sodium bicarbonate. 18.6 g. of the salicylic acid ester of salicylic acid-4'-chloro anilide, having a melting point of 192° C. are obtained thereby. They are saponified by heating with dilute mineral acid to salicylic acid-4'-chloro anilide, having a melting point of 167–168° C.

Example 9

A finely pulverized intimate mixture of 22 g. of 5-bromo salicylic acid, obtained by reacting a solution of salicylic acid in ethylene chloride containing hydrogen bromide, with bromine, and 13 g. of p-chloro aniline is stirred with 12 g. of N-dimethyl aniline and 30 cc. of dry benzene to form a homogeneous mass. 10 cc. of thionylchloride are added thereto and the reaction mixture is heated under reflux on the water bath for about 30 minutes. Benzene and excess thionylchloride are evaporated in a vacuum and the residue is treated first with dilute hydrochloric acid and then with sodium bicarbonate. 32.8 g. of 5-bromo salicylic acid-4'-chloro anilide are obtained which, after recrystallisation from alcohol/butanol, melt at 239–240° C.

Example 10

17.5 g. of bromine, dissolved in 30 cc. of glacial acetic acid containing hydrogen bromide, are added drop by drop at room temperature to a solution of 15 g. of salicylic acid-o-toluidide in 300 cc. of glacial acetic acid. The reaction solution is concentrated by evaporation. 18 g. of crystalline 5-bromo salicylic acid-2'-methyl-4'-bromo anilide are obtained which, on repeated recrystallisation successively from alcohol and benzene, melt at 215–216° C.

Example 11

By condensing equimolecular amounts of 2,4,6-trichloro aniline and salicylic acid by means of thionylchloride in benzene suspension and in the presence of 2 mol of N-dimethyl aniline, salicylic acid-2',4',6'-trichloro anilide is obtained. Bromine, dissolved in about three times its weight of glacial acetic acid, in an amount exceeding the calculated amount to about 10%, is slowly added, while stirring, to a solution of said anilide in about 20 times its weight of glacial acetic acid. The reaction mixture is moderately heated at the end of the reaction. Working up the reaction solution yields 5-bromo salicylic acid-2',4',6'-trichloro anilide which, on recrystallisation from alcohol or glacial acetic acid, melts at 226° C.

The same compound is obtained by condensing 5-bromo salicylic acid with 2,4,6-trichloro aniline by means of thionylchloride in benzene suspension and in the presence of N-dimethyl aniline.

Example 12

A solution of 9.4 g. of bromine in 10 cc. of carbon disulfide is added to a solution of 7 g. of 5-chloro salicylic acid-4'-chloro anilide in 200 cc. of carbon disulfide. 3-bromo-5-chloro salicyclic acid-4'-chloro anilide precipitates after a short period of time. Its crystals have a melting point of 190° C.

Example 13

15.2 g. of m-cresotic acid are condensed with 10.7 g. of o-toluidine by means of 15 g. of thionylchloride in the presence of 24 g. of N-dimethyl aniline and of 75 cc. of benzene. 4-methyl salicylic acid-2'-methyl anilide obtained thereby is dissolved in 10 times its weight of glacial acetic acid containing hydrogen bromide and 10% more than the calculated amount of bromine dissolved in acetic acid, are added thereto drop by drop. Subsequently the bromination product is chlorinated by introducing into said acetic acid solution 10% more than the calculated amount of chlorine at room temperature. On standing over night, 5-bromo-4-methyl salicylic acid-2'-methyl-4'-chloro anilide crystallizes. It melts, on recrystallisation from benzene, at 183° C.

Example 14

5.9 g. of 3.5-dibromo salicylic acid and 7.0 g. of 2,4,6-tribromo aniline are dissolved or suspended respectively in a mixture of 15 cc. of benzene and 24 cc. of N-dimethyl aniline. 8.5 cc. of thionylchloride are slowly added to said mixture while cooling and stirring. After allowing the reaction mixture to stand for some time, 3,5-dibromo salicylic acid-2',4',6'-tribromo anilide precipitates in crystalline form. It is filtered off by suction and is freed of dimethyl aniline hydrochloride by successively washing with water, with bicarbonate solution, and finally with methanol. It melts, after reprecipitation from its solution in dilute sodium hydroxide solution, at 260° C.

Example 15

8 cc. of thionylchloride are added to a solution of 13.8 g. of salicylic acid in 30 cc. of dry benzene. A solution of 24 cc. of N-dimethyl aniline and 25 g. of 2,4-dibromo aniline in 20 cc. of dry benzene is added drop by drop to said first mentioned solution while stirring and cooling (to about 50° C.). On standing over night, salicylic acid-2',4'-dibromo anilide is isolated and purified as described in Example 14. Its melting point is 187° C.

Example 16

15 cc. of thionylchloride are added drop by drop within half an hour to a heated solution of 17.3 g. of 5-chloro salicyclic acid, 17.2 g. of 2-bromo aniline, and 24 cc. of N-dimethyl aniline in 50 cc. of dry benzene. After standing for 2 hours, the volatile components of the reaction mixture are evaporated in a vacuum. The residue is washed successively with water, dilute hydrochloric acid, and sodium bicarbonate solution, and is then recrystallized from alcohol. 5-chloro salicylic acid-2'-bromo anilide is obtained which melts at 178° C.

Example 17

21.7 g. of 5-bromo salicylic acid and 17.2 g. of bromo aniline are condensed by means of thionylchloride in benzene and in the presence of 2 mol of N-dimethyl aniline. 5-bromo salicylic acid-2'-bromo anilide melting at 173° C. is obtained thereby.

Example 18

21.7 g. of 5-bromo salicylic acid are condensed with 12.8 g. of 3-chloro aniline as described in Example 16. 5-bromo salicylic acid-3'-chloro anilide melting at 220° C. is obtained thereby.

Example 19

69 g. of bromine dissolved in 50 cc. of glacial acetic acid containing hydrogen bromide, are added drop by drop, while moderately cooling, to a solution of 42.6 g. of salicylic acid anilide in 150 cc. of glacial acetic acid. After standing for some time, 73.4 g. of crude 5-bromo salicylic acid-4'-bromo anilide crystallize. Its melting point, after recrystallisation from alcohol/benzene, or ethylene chloride, is 233–234° C.

The same compound is also obtained by condensation of 21.8 g. of 5-bromo salicylic acid with 17.2 g. of 4-bromo aniline in 30 cc. of benzene and in the presence of 24 g. of N-dimethyl aniline by means of 10 cc. of thionyl-chloride. After half an hour, the reaction mixture is heated on the water bath for 1 hour. The mixture is then cooled and the volatile components are evaporated in a vacuum. The residue is washed successively with water, hydrochloric acid, and sodium bicarbonate solution in order to free it of impurities, and is recrystallized from alcohol. 5-bromo salicylic acid-4'-bromo anilide, melting at 233–234° C., is obtained thereby.

As stated above, the new halogen substituted arylamides of aromatic hydroxy carboxylic acids, especially the bromine substituted salicylic acid aryl amides, are very effective antifungal agents, whereby salicylic acid amides which have a bromine or chlorine substituent in 5-position of the salicylic acid nucleus and a bromine or chlorine substituent in 4-position of the amide nucleus have a much higher antifungal activity than compounds in which said halogen substituents are in 3- or 4-position of the salicylic acid nucleus and in 2- or 3-position of the amide nucleus.

It has furthermore been found that said halogen substituted amides, and more particularly the bromine substituted amides of the above given examples possess a high antibacterial activity, thus rendering them the ideal antifungal agents because they not only control the fungus infection but, at the same time, any accompanying bacterial infection. Compounds, such as 5-bromo salicylic acid-4'-chloro anilide, 5-chloro salicylic acid-4'-bromo anilide, 5-bromo salicylic acid-4'-bromo anilide and the like are, for instance, effective against Staphylococcus infections in a dilution of 1:500,000 and more. While the unsubstituted salicylic acid anilide is only useful in the treatment of ringworm of the scalp, i. e. in the treatment of tinea capitis due to *Microsporon audouini*, the halogen substituted salicylic acid arylamides, according to this invention, find application also in the treatment of other infections caused by fungi and bacteria. The following tables will give some data on the activity of compounds according to this invention; they represent the results of experiments which were carried out as follows:

0.5 cc. of a solution of the compound to be tested, diluted as indicated in the table, are placed into a cylindrical hole of 14 mm. diameter, cut and lifted out of a nutrient medium inoculated with the test microorganism, such as *Epidermophyton interdigitale, Trichophyton floccosum sui inguinale*. After a certain period of time of incubating the inoculated nutrient medium, the clear zone without growth of the microorganism is measured and its diameter in mm. is recorded.

5-CHLORO SALICYLIC ACID-4'-BROMO ANILIDE

| 1:1000 | 1:2000 | 1:5000 | 1:10,000 | 1:20,000 | 1:50,000 | After x hours |
|--------|--------|--------|----------|----------|----------|---------------|
| 39 | 37 | 34 | 33 | 28 | 26 | 24 |
| 39 | 34 | 32 | 32 | 27 | 20 | 96 |
| 35 | 31 | 28 | 27 | 22 | 18 | 192 |

5-BROMO SALICYLIC ACID-4'-CHLORO ANILIDE

| 40 | 36 | 33 | 30 | 28 | 24 | 24 |
| 38 | 35 | 31 | 29 | 26 | 21 | 96 |
| 36 | 32 | 29 | 26 | 23 | + | 192 |

Other compounds of this type show similar results.

The antifungal and antibacterial halogen substituted arylamides of aromatic hydroxy carboxylic acids, and more particularly the halogen substituted salicylic acid arylamides are administered in various forms. Solutions are prepared of mixtures of polyglycol ethers and water. Or ointments are used containing the commonly used ointment bases consisting, for instance, of paraffins, lanolin, and vaseline. Furthermore, they can be employed in the form of water-in-oil emulsions or of oil-in-water emulsions or as jelly whereby, for instance, methyl cellulose or other water soluble cellulose ethers are used as vehicle, preferably with the addition of a small amount of a polyglycol ether.

The active antifungal and antibacterial compounds, according to this invention, are preferably used in diluted form. In general, a concentration of about 1% to 2% of the active compound in the mixture with a suitable diluting agent has been found sufficiently effective. It is essential that the active compound is uniformly and evenly distributed throughout the vehicle. If a vehicle is used wherein the active compound is only difficultly soluble, care must be taken that the particle size of the active compound does not exceed about 300 microns. The particle size preferably is between about 20 microns and about 80 microns.

Such fine dispersions can be produced, for instance, by emulsifying the active ingredient or a solution of the same with the aid of a dispersing or emulsifying agent.

The active compounds can also be used in the form of a solution of the active ingredient in a suitable inert liquid or semi-solid diluting agent. Inert solvents used for this purpose should not be easily inflammable and should be substantially odorless. They should also be substantially non-toxic towards human beings and animals when used properly. Furthermore they should not chemically affect the active substance nor the material of the containers wherein the preparation is stored. Mixtures of solvents may also be employed. The solutions are prepared in the usual manner whereby, if necessary, solubility promoters may be added.

Other practical forms of administering the active compounds are the emulsion or suspension form of the active compound in suitable inert solvents. Concentrates for preparing such emulsions or suspensions may also be prepared which are diluted with suitable diluting agents at the time and place of use. Such emulsions are prepared, for instance, by mixing the active compound with a dispersing or emulsifying agent. Said concentrated mixtures may then be diluted at the time and place of use with suitable diluting agents to prepare an emulsion or suspension ready for use.

Various surface active substances may be employed as dispersing or emulsifying agents. There may be mentioned, for instance, the following: Fatty alcohol sulfonates, Turkey red oil, higher molecular quaternary ammonium compounds, condensation products of alkyl and aralkyl compounds and alkylene oxide and others.

Another very advantageous way of administering said active compounds consists in applying them in the form of a cream, ointment, paste, or wax, into which the active compound is worked with the aid of solubility promoters and/or emulsifying agents, if required.

Other additives may also be added to said preparations containing active compounds according to this invention. Among them there may be mentioned adhesives, glues, resins, wetting agents, dyestuffs, perfumes and others.

It is possible, by selecting the various diluting agents and additives, to give the agents such a composition and properties, depending thereon, as to render them suitable for special purposes or conditions of use. Thus, dips, sprinkling agents, spraying agents, solid soaps, emulsions, suspensions and others may be prepared.

Of course, many changes and variations in the methods of producing said active compounds, in the concentration, reaction duration and temperature, the solvents used, the condensing agents employed, the methods of working up the reaction mixture and isolating the active compounds, the manner in which they are combined with other ingredients, such as solvents, or other carrier materials, and in which they are administered for the treatment of fungal and bacterial infections, and the like may be made by those skilled in the art in accordance with the principles set forth herein and in the claim annexed hereto.

By "glacial acetic acid containing hydrobromic acid," a glacial acetic acid is understood which contains about 5–10% of hydrobromic acid.

The above described halogenated salicylic acid amides have been found to be useful in the treatment not only of the "ringworm" of the scalp, but also in the treatment of other fungus infections, such as trichophytia superficialis, epidermophytia manum et pedum, epidermophytia inguinalis, dyshidrosis, dyshidroformous eczema, universal dermatitis with secondary coccous infections, interdigital mycoses, trychophytide of the face, nummulary eczema. Furthermore they are very effective chemotherapeutic agents and have a high bactericidal and bacteriostatic activity against many bacteria, among them, against *Staphylococcus aureus*, *Escherichia coli*, *Mycobacterium tuberculosis*.

I claim:

5-bromo salicylic acid-4'-chloro anilide of the following formula

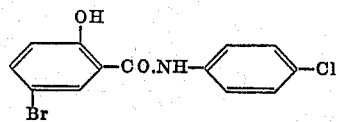

References Cited in the file of this patent

UNITED STATES PATENTS

| | | |
|---|---|---|
| 1,101,111 | Zitzcher | June 23, 1914 |
| 1,873,365 | Fargher | Aug. 23, 1932 |
| 1,890,201 | Tinker et al. | Dec. 6, 1932 |
| 1,955,802 | Goldstein | Apr. 24, 1934 |
| 2,047,513 | Laska et al. | July 14, 1936 |
| 2,047,514 | Laska et al. | July 14, 1936 |
| 2,063,590 | Dahlen et al. | Dec. 8, 1936 |
| 2,410,397 | Weiss et al. | Oct. 29, 1946 |
| 2,703,332 | Bindler | Mar. 1, 1955 |
| 2,731,386 | Reiner | Jan. 17, 1956 |

FOREIGN PATENTS

| | | |
|---|---|---|
| 556,476 | Germany | Aug. 10, 1932 |
| 565,340 | Germany | Nov. 30, 1932 |

OTHER REFERENCES

Dierbach: "Liebigs Annalen," vol. 273 (1893), page 122.

Jadhav et al.: "J. Univ. Bombay," vol. 20, Section A, Pt. 3 (1951), pages 97 to 100.

Beran et al.: "Mitt. Chem. Forsch. Inst. Ind. Oster.," vol. 5 (June 1951), pages 43 to 49.

Okazaki et al.: "J. Pharm. Soc. Japan," vol. 72 (1952), page 1041.

Matta et al.: "Anais Azevedos" (Lisbon), vol. 3 (1951), pp. 145–146, abstracted in Chem. Abstr., vol. 46 (1952), p. 4746.

Hirwe et al.: "J. Indian Chem. Soc.," vol. 16 (1939), pp. 281 to 284.

Allan et al.: "Organic Syntheses," vol. 26 (1946), pp. 92 to 94.

Hughes et al.: "J. Chem. Soc." (London), vol. 99 (1911), pp. 25 and 26.

Hirwe et al.: "Proc. Indian Acad. Sci.," vol. 8A (1938), pp. 208, 209, 210.

Anschutz et al., "Liebigs Annalen," vol. 346 (1906), pp. 305, 314, 326, and 332.

Schwartz: New York State J. Med., August 15, 1947, pp. 1782–1785.

Weaver et al.: Navy Department Office of Naval Research, "Chemical Studies on Fungicides," Part I, Report No. P-2877, July 19, 1946, pp. 1–6, 11–14.

New and Nonofficial Remedies, 1951, A. M. A., XXVII–XXXI.